Nov. 16, 1965    R. J. CRISSY ETAL    3,217,643
CREDIT CARD BEARING PRINTABLE SIGNATURE INDICIA
Original Filed June 8, 1962
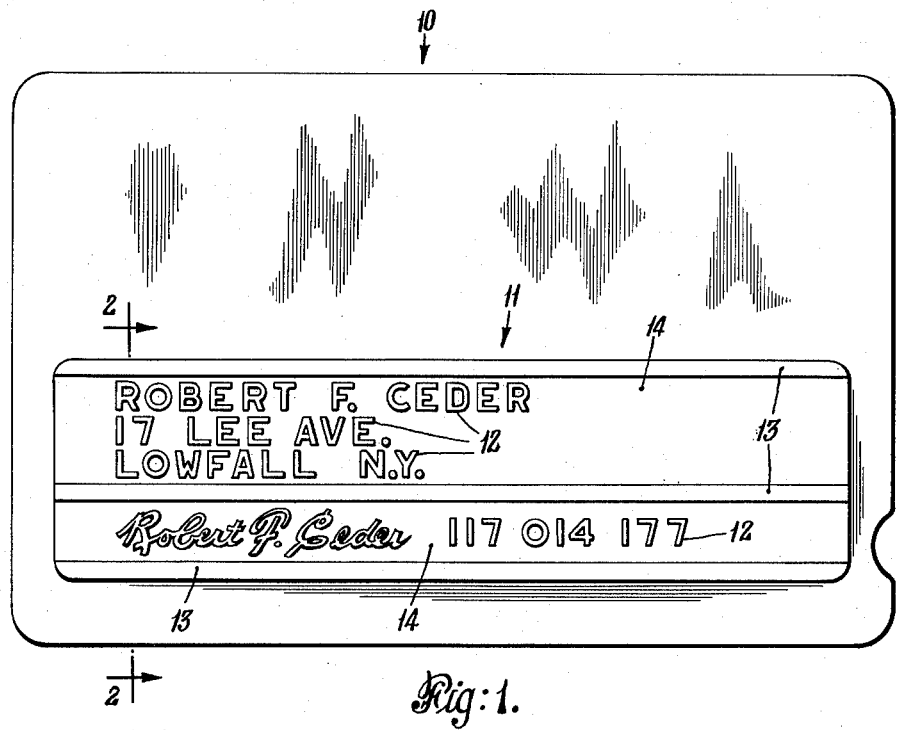
Fig: 1.
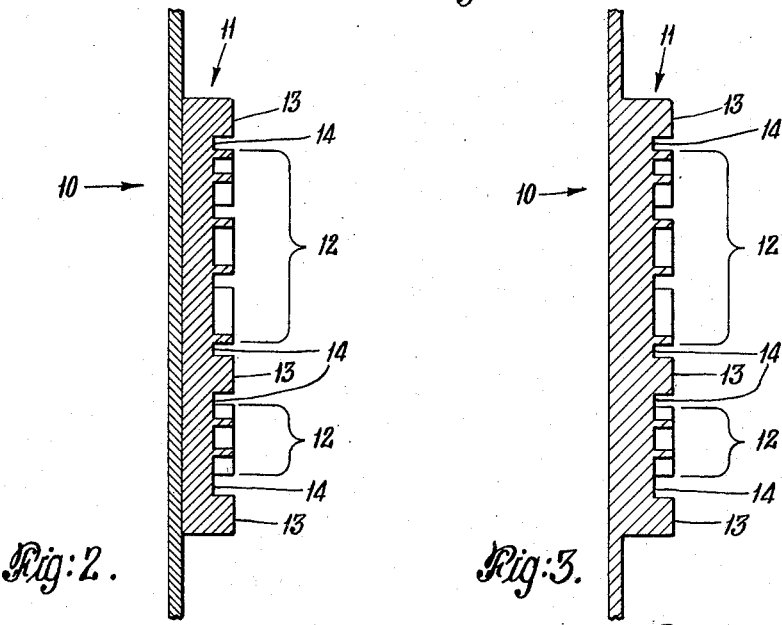
Fig: 2.    Fig: 3.
INVENTORS.
ROBERT J. CRISSY
JOSEPH E. GILLIGAN
BY *Frank E. Braham*
ATTORNEY.

3,217,643
CREDIT CARD BEARING PRINTABLE SIGNATURE INDICIA
Robert J. Crissy, West Caldwell, N.J., and Joseph E. Gilligan, West Newton, Mass., assignors, by mesne assignments, to Plastron, Inc., Wellesley, Mass., a corporation of New Jersey
Continuation of application Ser. No. 201,071, June 8, 1962. This application Nov. 19, 1963, Ser. No. 324,714
1 Claim. (Cl. 101—401.1)

This is a continuing application of application Serial No. 201,071, now abandoned, filed June 8, 1962.

This invention relates to an identification card, and especially to one of the type generally referred to as a credit card.

As is well known, such cards are now being used in great numbers by many different types of business firms to authorize credit purchases. When a sale is made, the one to whom the card was issued, who will be referred to as the customer, presents the card to the seller, who then uses the card to imprint a record of the customer's identifying information on a preprinted sales slip. In general, the sales slip is then signed by the customer, after which the card and a carbon copy of the imprinted sales slip are returned to the customer; and finally, the signed imprinted sales slip is forwarded to a designated accounting department for subsequent billing purposes.

In the main, such cards are provided with two sources of information. One source identifies the prime issuer of the card, while the other source identifies the customer. Since the information that identifies the prime issuer of the card is the same on all of the cards and since this information need not be transferred to the sales slip when a record of a sale is made, such information may be and is generally preprinted on the cards. However, the information that identifies the customer is, of course, different for each card and it must be placed on the card in such manner as to enable it to be transferred to the sales slip during the sales transaction.

As presently produced, the customer identifying information is embossed on the card, and this is done mechanically, character by character, with the result that for purposes of economy and expediency the amount of information that identifies the customer is held to a minimum. The embossed card thus produced is subject to many other disadvantages. For example, the imprinting done with such cards is not sharp and well defined due to the hollow nature of the embossed characters. As a result, errors can occur when poorly imprinted sales slips are read by the conventional magnetic character recognition and optical scanning means now employed for that purpose. Moreover, the embossed characters impair the legibility of the printed information usually contained on the back of the presently used cards. Also, to improve legibility, the embossed areas are generally provided with a surface application of color to make them contrast with the background of the material in which they are embossed. In practice, however, it has been found that the color wears off and the legibility decreases as the cards are used.

Perhaps the greatest disadvantage of the embossed card is that the customer identifying information is limited to the name, address and account number of the customer, all placed mechanically on the card. Actually, more information would be extremely desirable. For example, it would be helpful if the card also contained the signature and/or photograph and/or fingerprints of the one to whom the card was issued, so that the signature on the card could be imprinted on the sales slip and compared with the written signature on the sales slip and a direct comparison could be made of the photograph and fingerprints if desired. In addition, it would be helpful if the card could print additional information, either readable or in code form, on the sales slip such as the expiration date of the card. Also, in many instances it would be helpful if the card could imprint information on a sales slip such as the seal or trademark of the prime issuer of the card. If this type of information is provided, and a credit card of one company is used to imprint sales slips of another company, as is frequently the case with the presently used cards, the error could easily be detected in the accounting department.

Accordingly, it is the object of the present invention to provide an improved credit card that obviates the disadvantages of the embossed cards.

It is a further object of the present invention to provide a credit card that is capable of containing a facsimile of the signature or likeness of the person to whom the card is issued, which signature or likeness will be reproduced in the imprinting process.

In carrying out the invention the credit card is provided with a light sensitive portion which is photographically exposed to the information to be placed on the card to identify the person to whom the card is issued and thereafter etched to provide a relief imprinting member corresponding to the information photographically reproduced thereon.

Features and advantages of the invention may be gained from the foregoing and from the description of a preferred embodiment thereof which follows.

In the drawing:

FIG. 1 is a plan view of a credit card or instrument constructed in accordance with one embodiment of the present invention;

FIG. 2 is a sectional view of the card taken along line 2—2 of FIG. 1; and

FIG. 3 is a sectional view similar to FIG. 2 but showing another embodiment of the invention.

As shown in FIGS. 1 and 2 of the drawing, the credit card comprises a background card 10 with an etched imprinting member 11 secured thereto. The background card is provided with printed matter that identifies the prime issuer of the card, and, if so desired, with additional printed matter which sets forth the terms and conditions under which the card is issued. This printed matter may appear on both sides of card 10. The member 11 is adapted, when placed in the impression devices used, for example, in department stores, gasoline service stations, rental agencies, and other business establishments offering sales on credit, to imprint the customer's identifying information on the conventional carbon interleaved sales slip or bill.

The imprinting member 11 preferably comprises a strip of light sensitive material, preferably a photopolymerizable plastic, and in preparing the same all the information that the prime issuer of the card desires to have imprinted on a preprinted form such as a sales slip or the like is created by contact or other well known photo-exposure techniques on the strip in the form of light affected areas surrounded by light unaffected areas. The strip of material may then be developed in the manner now well understood to render the light affected areas resistant to the action of a solvent of the material. With certain materials the action of the light itself is sufficient to render the exposed areas resistant to the action of the solvent. Thereafter, the light unaffected areas are etched or washed out by a solvent, and thus leave in relief imprinting areas 12 that correspond to the light affected areas, and hence to the information the prime issuer of the card desires to have imprinted on a preprinted form.

During the development of the strip the light affected areas turns dark but the rest of the material remains unaffected. In consequence, there is a sharp contrast in color between the printing and the non-printing areas of the strip, with the result that after the strip is mounted on the card 10 to form the printing plate 11, the imprinting areas are clearly legible. Furthermore, since the discolorations of the material extends below the surface of the printing areas, the legibility of the printing areas remains constant after extended use.

In the embodiment of the invention shown in FIGS. 1 and 2, member 11 has been prepared to imprint the name, address, account number and signature of the one to whom the card was issued. However, since the member is created photographically, and this may be done from the customer's application for credit form, it is obvious that as much additional information as the prime issuer of the card desires may be provided with little or no added expense. In addition, this information may be readable, and in code, or in pictorial form, or in any desired combination thereof with the result that the prime issuer of the card can now have imprinted on a preprinted form such additional information as an expiration date of the card, a picture and the fingerprints of the one to whom the card was issued, as well as the seal, trademark or other means of identifying the prime issuer of the card.

In accordance with the embodiment of the invention shown in FIGS. 1 and 2, member 11 is permanently bonded to the background card 10. However, in some instances, it may be desirable to make the member in two sections, one of which would be adapted to imprint information such as the name, address, account number and signature of the one to whom the card was issued, and which remains constant; and the other of which would be adapted to imprint information such as the expiration date of the card, which of course changes from time to time. In this case, the section of the member that is adapted to print the constant information would preferably be permanently bonded to the background card 10, while the other section would be removably secured to the card 10 by any suitable means, such as pressure sensitive adhesives.

By thus creating the imprinting member 11, and so eliminating the time consuming task of embossing the member with the information, the prime issuer desires to have imprinted on a preprinted form, the cost of producing identification cards is sharply reduced. Furthermore, the card per se may now be made of cheaper material, and this, too, reduces the overall cost of making such cards. In addition, since the imprinting areas are etched rather than embossed, the imprints on the preprinted forms are sharp and well defined, with the result that they are easily and accurately scanned and recognized by magnetic ink character recognition or other well known machine optical recognition as well as by human recognition and fluorescent deposit recognition means.

In accordance with another feature of the invention, means are provided to reduce the depth to which member 11 need be etched to create in relief the character imprinting areas 12 and still prevent the etched background areas 14 from imprinting. This is important, since by so doing, the cost of creating the imprinting member 11 is reduced considerably. To this end, ribs 13 are created adjacent the character imprinting areas 12. If desired, the ribs 13 may be made ornamental in nature to enhance the general appearance of the card.

In the event it is desired to create an intaglio imprinting member, the exposure step would be reversed, that is to say, the information the prime issuer of the card desired to have imprinted on a preprinted form would be initially created on the strip of light sensitive material in the form of light unaffected areas surrounded by light affected areas.

A further emboidment of the invention is shown in FIG. 3 where the entire card, including the background area and the imprinting area, is a unitary structure insofar as the imprinting member 11 is not a separate element fastened to a background card. In fact, the imprinting area may make up the entire credit card.

While the present invention has been described in connection with an identification card of the type generally referred to as a credit card, it is to be understood, that this was done merely for purposes of illustration, and that the principles involved are equally applicable in the production of any type card that comprises the combination of an identification card having printed matter thereon that identifies the prime issuer of the card, and a printing plate or member attached to the card adapted to print information that identifies the one to whom the card was issued.

Having thus described our invention, we claim:

The method of making a customer identification card used in credit transactions for imprinting, without being inked, customer data onto a business form, said identification card having a background element that is preprinted with data relating to the issuer of said identification card, and further having secured to said background element an imprinting member comprising a relief replica of the customer's signature, said method comprising the steps of providing an original of the customer data including the customer's signature that is to appear on the card, photographically exposing a light sensitive element to said original to form light affected areas corresponding to said data surrounded by light unaffected areas, and thereafter etching said element to remove the light unaffected areas whereby a relief imprinting member is formed having indicia including a signature thereon identifying the one to whom the card is issued.

References Cited by the Examiner

UNITED STATES PATENTS

| | | | |
|---|---|---|---|
| 1,781,739 | 11/1930 | Tiefel et al. | 101—351 X |
| 1,989,635 | 1/1935 | Detwiler | 101—369 |
| 2,268,679 | 1/1942 | Van Dusen | 101—369 |
| 2,349,163 | 5/1944 | Gibbs. | |
| 2,557,652 | 6/1951 | Gollwitzer | 101—369 |
| 2,693,756 | 11/1954 | Haig et al. | 101—369 |
| 2,791,504 | 5/1957 | Plambeck | 96—115 |
| 2,865,750 | 12/1958 | Trevoy. | |
| 2,893,868 | 7/1959 | Barney | 101—401.1 X |
| 2,953,988 | 9/1960 | Seifried et al. | 101—369 |

ROBERT E. PULFREY, *Primary Examiner.*

EUGENE R. CAPOZIO, *Examiner.*